United States Patent [19]

Lobb

[11] 3,972,584

[45] Aug. 3, 1976

[54] COMPOUND OPTICAL SYSTEM WITH IMAGE TILT COMPENSATION

[75] Inventor: Daniel Richard Lobb, Farnborough, England

[73] Assignee: Redifon Limited, England

[22] Filed: June 26, 1974

[21] Appl. No.: 483,386

Related U.S. Application Data

[63] Continuation of Ser. No. 286,969, Sept. 7, 1972, abandoned.

[30] Foreign Application Priority Data

Sept. 7, 1971 United Kingdom............... 41648/71
Jan. 13, 1972 United Kingdom................ 1638/72
Aug. 18, 1972 United Kingdom............... 38571/72

[52] U.S. Cl.................................... 350/48; 350/8; 350/27; 350/55
[51] Int. Cl.[2]......................................... G02B 17/00
[58] Field of Search .................. 350/8, 48, 45, 181, 350/27, 55

[56] References Cited
UNITED STATES PATENTS 2,354,614  7/1944  Reason .......................... 350/181 X
3,639,034  2/1972  La Russa ........................ 350/181 X
3,655,260  4/1972  Bartucci et al. ..................... 350/45

*Primary Examiner*—David H. Rubin
*Attorney, Agent, or Firm*—Larson, Taylor and Hinds

[57] ABSTRACT

An optical arrangement, particularly for ground-based flight simulating apparatus using an optical probe moving over a terrain model to provide a visual display of terrain overflown.

The optical arrangement provides a fully in-focus image on a television camera tube target which is inclined relatively to the plane of the terrain model.

The optical arrangement may equally be applied to a laser beam scanned terrain model.

The arrangement comprises first and second optical systems, usually lenses or lens combinations, and a deflecting means therebetween, usually lens, prism and mirror elements, producing a tilt of the in-focus image plane of the overall system.

13 Claims, 7 Drawing Figures

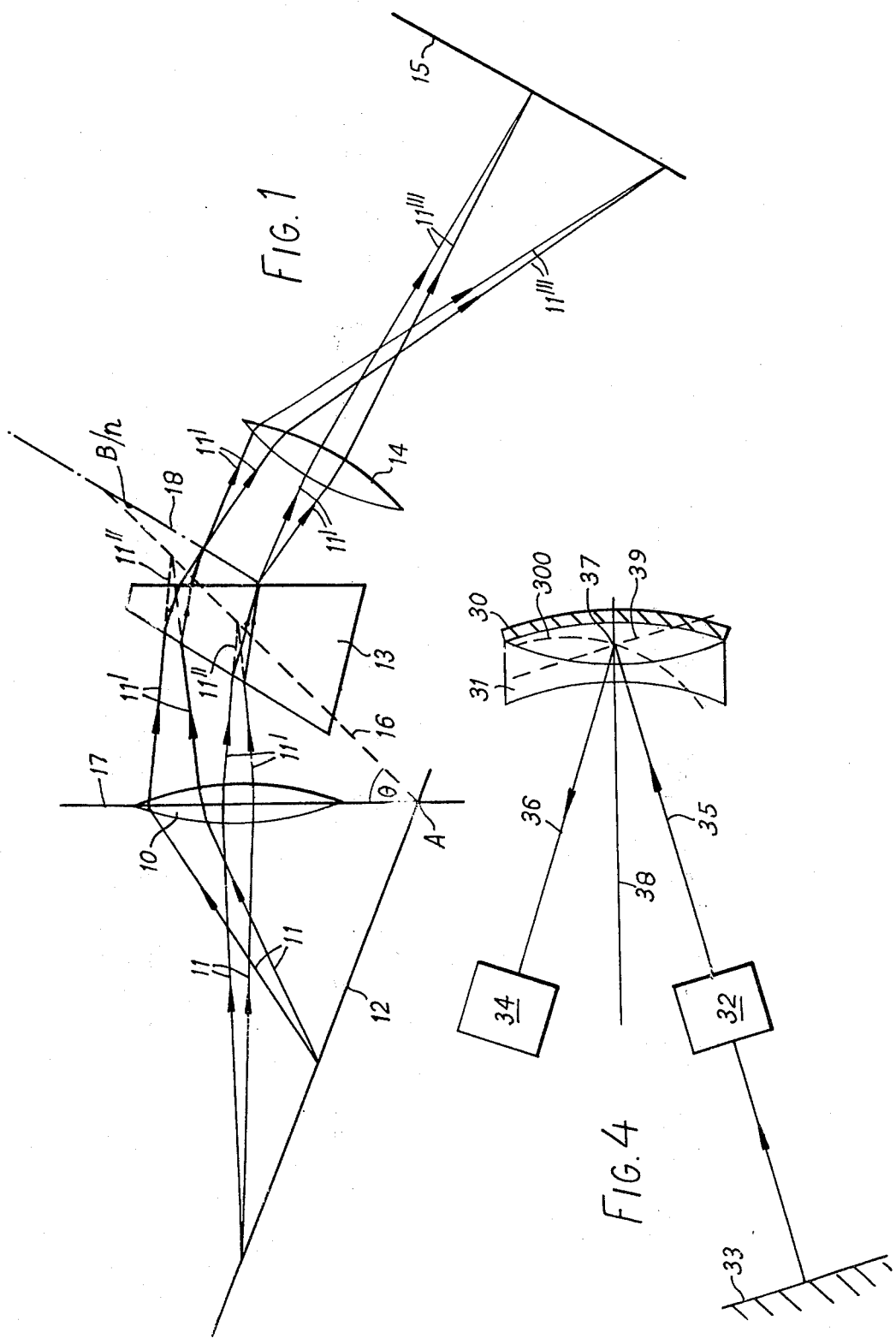

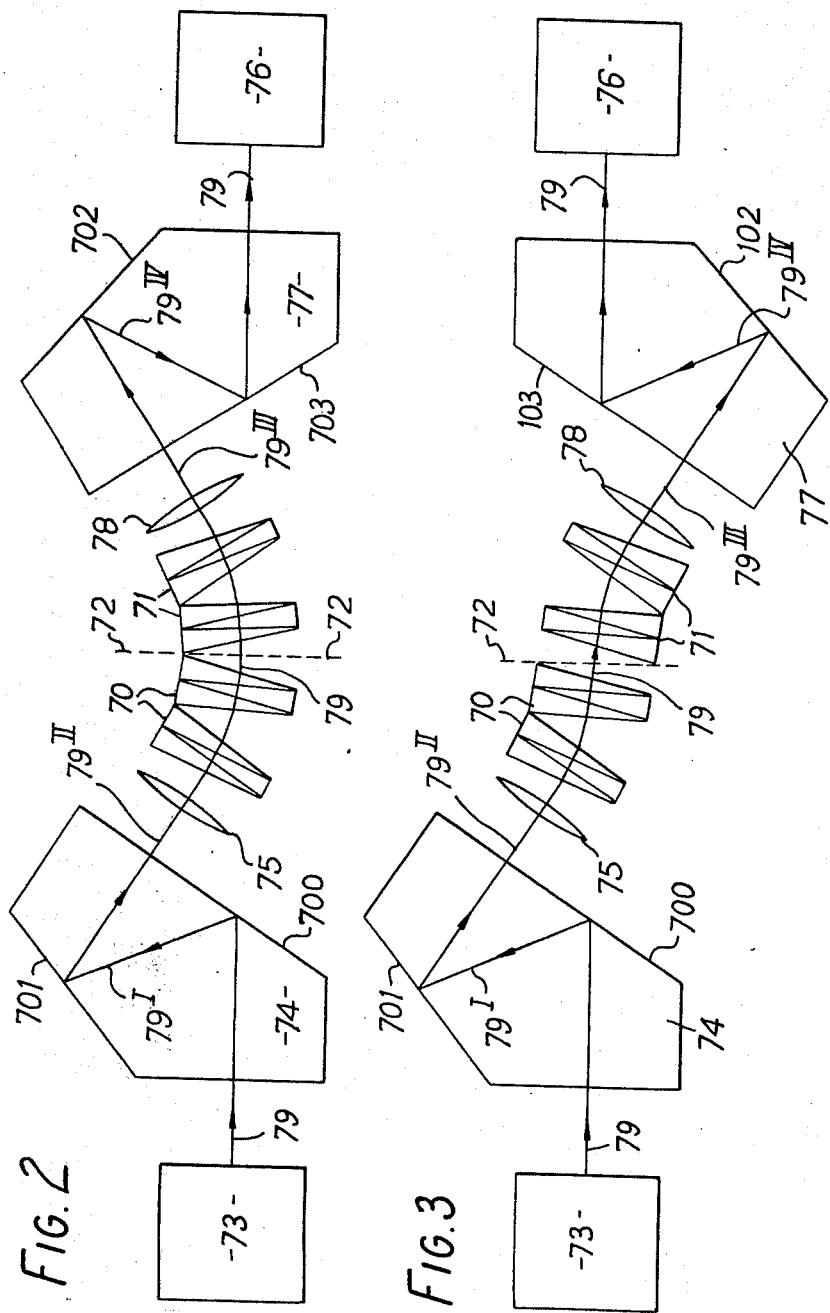

COMPOUND OPTICAL SYSTEM WITH IMAGE TILT COMPENSATION

This is a continuation of application Ser. No. 286,969 filed Sept. 7, 1972 now abandoned.

This invention relates to optical systems for use where an optical image is to be formed of an object surface which may not be normal to the optical axis of the imaging system, enabling the image to be well focused over the full image area, on a surface which is normal to the optical axis of the imaging system, and the invention relates more generally to optical systems in which the tilt of an in-focus image surface, with respect to an axis of the system is to be altered or adjusted.

In many optical imaging applications it is necessary to form an image of a surface which is not normal to the axis of the optics. In photography, for example, a camera is frequently held with its lens axis horizontal and a picture is taken of a horizontal surface such as a road or a table top. In a camera, as in most image forming instruments, the surface on which the final image is required, in this case the film plane, is normal to the optical axis. However, if an object surface is tilted with respect of the normal to the optical axis, then the corresponding image surface at which an in-focus image is formed is also tilted with respect to the normal to the optical axis. According to the Scheimpflug rule, the planes including the axial portions of object surface and image surface respectively, if extended, will intersect at the plane including the imaging lens. It follows that, when an image of a non-normal surface is formed, the image is generally out-of-focus on the required image surface, except for a narrow band where the tilted, in-focus image plane intersects with the required image surface.

In practice, optical systems have a certain depth of focus which, in relation to an image surface, may be defined as that volume which is bounded by two surfaces, one on each side of the in-focus surface, within which the extent of image defocus is acceptable. In most photographic and other image forming optical systems, it is generally possible to arrange that in-focus image surfaces, albeit tilted with respect to the film plane or other surface on which an image is required, lie within the depth of focus of the systems.

In some cases, however, it is desirable to optimise focus over a large image area by compensating for the in-focus image surface tilt due to a non-normal object surface. It is common practice in such cases to introduce a tilt, either of the surface on which a final image is required, for example the film plane, or of the lens. The tilt in either case is calculated, using the Scheimpflug rule, so that the in-focus image surface coincides with the surface on which the image is required.

We have so far considered optical systems, such as cameras, in which a final image is preferably to be formed on a surface orthogonal to the optical axis. In such cases it is desirable to compensate for tilt of object surfaces. In some optical systems it is necessary to form an image on a surface which is not orthogonal to the optical axis of the projection optics, although it will generally be convenient for the corresponding object surface to be orthogonal or nearly orthogonal to the optical axis. In such optical systems, it is generally desirable to produce tilt in the in-focus surface to match the tilt of the surface upon which the image is to be projected.

Any optical arrangement which may be used to compensate for tilt in an object surface may alternatively be used to produce tilt in an in-focus image surface. The positions of object surface and in-focus image surface may simply be reversed. Thus, in a slide projector system in which an image is required to be projected onto a screen not orthogonal to the radiation propagation direction, the focus of the image on the screen may be optimised by tilting the projector lens by an angle calculated according to the Scheimpflug rule.

In some optical systems, very large tilts appear in in-focus image surfaces, so that it becomes difficult, using available components, to compensate for the tilt by the classical method of tilting elements in the optical system. The present invention may be used in such optical systems.

Also, in some optical systems, it is necessary to accommodate very large tilts in the surface on which a final image is required so that it is difficult, using available components, to produce the required tilt by the classical method. The present invention may be used in optical systems in which either a large tilt of an object surface must be compensated or a large tilt must be produced in an in-focus image surface. It is to be particularly noted that the same devices may be used either for tilt compensation or for tilt production.

The invention has a specific use in visual simulation systems, such as are used for example in ground-based, flight simulating apparatus. In such systems, it is common practice to use a model of the terrain to be flown over in simulated flight and to relay an image of the terrain to the trainee crew via a closed circuit television system. An image of the model is first formed onto a television camera target by an optical arrangement known as a probe. The present invention is applied in such probe optics. The entrance pupil of the probe optics is manoeuvred above the model terrain so that the picture relayed to the trainee crew is continuously in the required perspective. To achieve correct perspective, the separation of the probe entrance pupil from the model must be proportional to the simulated aircraft height, in the proportion of the model to real terrain scale ratio.

In a practical flight simulator system, a minimum separation between the probe entrance pupil and the model surface, simulating an aircraft position on a runway, may be only about 2 mm. It is necessary that the entrance pupil diameter of a practical probe should be at least about 0.5 mm in order for the probe to collect sufficient light, and also in order to give an acceptable diffraction limit on probe optical resolution. Since it is difficult to design well-corrected lenses with high numerical apertures, that is large ratio of pupil size to focal length, the focal length of probe optics can in practice be no less than a few millimeters, a reasonable minimum being about 3 mm.

Model surfaces may be regarded as flat and, with a simulated aircraft positioned on a runway, the probe optical axis is effectively parallel to the model surface is most simulator systems. Applying the Scheimpflug rule, and assuming the minimum entrance pupil to mode separation and the focal length estimated above, the calculated tilt of the primary in-focus image plane with respect to the normal to the optical axis, is 56°.

In a simulator system, an image plane tilt of this order cannot readily be compensated either by tilting the television camera target with respect to the probe optics, or by tilting a lens in the probe optics.

Tilting of the target surface is not mechanically feasible in simulator systems, and would introduce excessive image distortion.

Probe systems have been constructed in which tiltable lenses are used, according to known methods, to provide a measure of compensation for tilt of the primary in-focus image plane. To be effective in compensating for primary image tilt, a tiltable lens must have some dioptric power, that is, power to converge or diverge light beams, and it must be set in a position in the optical system where it has an appreciable converging or diverging effect on beams associated with field-of-view image points, that is, it must not be a field lens set at an image plane. Typically, a single tiltable lens may follow the objective lens of a probe, collimating light received from the primary image formed by the objective. As the primary image tilts, the tiltable lens is tilted through the same angle, so that the primary image remains in the focal plane of the tiltable lens. Thus, light from the whole primary image area is always collimated.

More complex probe systems have been constructed in which more than one lens is tilted, the function of compensating for primary image tilt being effectively divided between the tilting lenses.

In optical systems in which lenses are tilted to compensate tilt of object or primary image surfaces, including complex systems such as simulator probes, it has been common practice for each tilted lens to be rotated about a tilt axis in the region of the lens itself.

Commonly a lens is tilted about a nodal point, in order to avoid movement of the transmitted image due to the lens rotation. In existing systems, tiltable lenses having large field angles but only moderate numerical apertures are used. It is therefore necessary for each tilt lens to be rotated about a tilt axis not far removed from the lens entrance pupil, since large lateral movement of the lens pupil would cause unacceptable vignetting. In no known tilt lens system for compensating primary image tilt, is a tiltable lens rotated about an axis of rotation in or near a neighbouring image plane.

Since, in existing systems, each tiltable lens is tilted about an axis in the region of the lens itself, as a lens is tilted through an angle $\theta$, the centre of the image to be relayed by the lens moves to a part of the angular field of the lens which is approximately $\theta$ of the lens axis. To preserve good resolution in the relayed image, the tiltable lens must be corrected for image aberrations over a semifield angle approximately equal to, or somewhat in excess of, the maximum angle $\theta$ through which the lens is to be tilted. Where comparatively small lens tilt angles are required, as in most photographic applications, the off-axis correction of tilted lenses is generally adequate. However, where large lens tilt angle are required, as in simulator probes, it has been found difficult to provide adequate correction for optical aberrations of the tiltable lenses over their necessarily large field angles, even when more than one tiltable lens is employed to divide the tilt angle to be introduced at each. Thus, existing simulator probes have not provided well-resolved images for the smallest required separations of the probe entrance pupil from the model.

The invention may also be used in visual flight simulation systems as described above, but in which the probe is replaced by a laser beam scanning system which projects a moving beam on to the model terrain and in which laser light reflected from the model terrain is collected on photo-detectors. The photo-detector output signals provide a video signal similar to that which would be provided by a television camera in a probe. In order for the video signal to provide a picture in correct perspective, it is necessary for the exit pupil of the laser beam scanner, that is, the aperture from which the beam is scanned, to be manoeuvred above the model terrain in the same way as the entrance pupil of a probe. The separation of the exit pupil from the model surface must be proportional to the simulated aircraft height in the proportion of model to real terrain scale ratio.

In a practical system, the minimum separation of the laser scanner exit pupil from the model surface may be only about 2 mm. The laser beam width at the exit pupil must be at least about 0.5 mm for at least part of the scan, in order to give an acceptable diffraction limit on the angular resolution of the scan. It is desirable that the laser beam should be continuously in focus on the model surface, even though the surface is at an acute angle to the radiation propagation direction. Beam deflecting devices such as may be used in the laser beam scanning system cannot readily be made to alter the beam convergence or divergence angle as the beam is deflected. If the device scans the beam so that it is in focus in a line or plane, then the line or plane must generally be substantially orthogonal to the radiation propagation direction.

The laser beam scanning system must therefore preferably include an optical system capable of producing a tilt, with respect to the orthogonal to the optical axis or radiation propagation direction, in the surface on which the laser beam reaches its focus. The optical system will be set between the scanning device and the exit pupil. The system will receive light from a real or virtual "object" surface orthogonal to the beam direction, on which the beam is in focus, and form an image of this object surface on an image surface which is generally tilted with respect to the orthogonal to the beam direction.

The problem of producing image surface tilt in a laser beam scanning system is essentially similar to the problem of compensating for object surface tilt in a probe. The same optical systems may in principle be used in the two cases, with object and image surfaces being interchanged in the two cases. The final lens in the laser beam scanning system, which takes the place of the front lens of a probe, may, with a 0.5 mm external pupil, have a minimum focal length of about 3 mm. When the pupil is only 2 mm from the model surface, if the laser beam is to be focussed on the model surface, then the laser beam must also be in focus as it scans along a line or in a plane tilted at about 56° to the back focal plane of the final lens. This is the tilt angle to be produced by a tilt compensating optical system.

Once or more tilted relay lenses may be employed in a laser beam scanning system, set between the beam deflecting device and the final lens before the exit pupil. But as in the case of the probe, a tilt angle of order 56° cannot readily be dealt with using available lenses as tilting lenses in a conventional configuration.

One object of the present invention is to provide an optical system of the type first-described above, having means for correcting large tilts of an in-focus image surface, so that a final image may be formed on a surface substantially normal to the radiation propagation direction, which final image is in good focus over the whole image area.

Another object of the invention is to use the same means to produce tilt in an in-focus image plane, for example in a laser beam scanning system.

In order that the invention may be readily carried into practice, a number of embodiments will now be described in detail, by way of example, with reference to the accompanying drawings, which show optical systems providing tilt compensation for relatively tilted image surfaces by various optical devices comprising a refracting wedge, and in which:

FIG. 1 is a diagram showing an optical system in which the refracting wedge is a simple prism;

FIG. 2 shows an optical system in which the refracting wedge is a counter-rotating prism system;

FIG. 3 shows a modified form of the system of FIG. 2, with refracting wedge elements rotated to a new position;

FIG. 4 shows an optical system in which the refracting wedge is a diverging lens;

Figure 5:
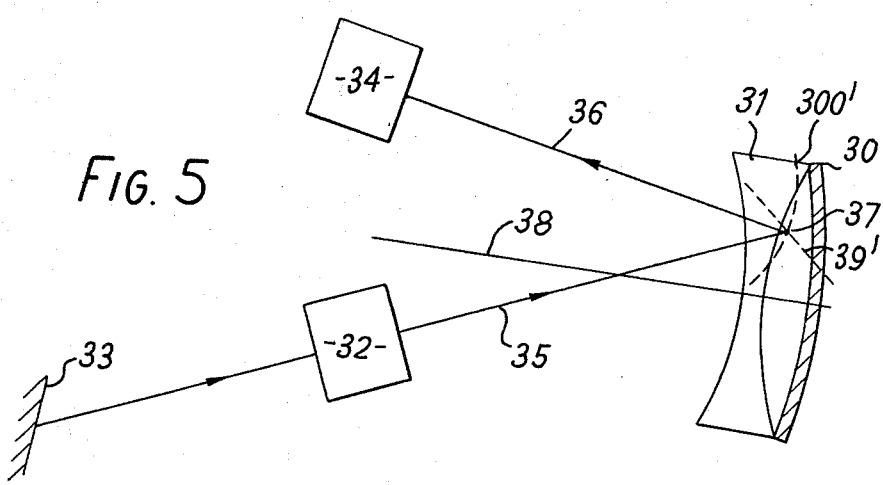
FIG. 5 shows a modified form of the system of FIG. 4, with the refracting wedge moved to a new position.

One practical arrangement according to the invention is shown in FIG. 1. In the arrangement of FIG. 1, a lens 10, forming a first optical imaging system, receives rays 11 from an object in plane 12. Emerging rays 11 form a first real image through an interposed glass prism 13.

As shown in FIG. 1, the object plane 12 is inclined to the plane 17 of lens 10. In the absence of the prism 13, lens 10 would form a real image on a plane 16 and making an angle $\theta$ therewith. The image in plane 16 is indicated by the dotted ray lines 11''.

According to the Scheimpflug rule, the object plane 12, lens plane 17 and image plane 16 have a common line of intersection A. The tilt angle of plane 16, that is the angle in the plane of FIG. 1 formed between plane 16 and any plane orthogonal to the optical axis of lens 10, is $\theta$, as shown.

The invention includes the prism 13 to compensate for this tilt.

The prism 13 refracts the rays 11' to form a real image in a plane 18, shown in chain line, instead of in the plane 16.

The resultant deflection of the in-focus image surface, due to refraction by the prism 13, is the value $-B/n$, where B is the angle through which the rays 11' are refracted and $n$ is the refractive index of the glass of prism 13. In FIG. 1, the plane 18 is shown making the angle $-B/n$ with the plane 16.

With respect to the light-propagating direction, the angle of deflection of the in-focus plane is $-(B + B/n)$. It is arranged that:

$$-\theta = B + B/n$$

so that the plane 18 is then orthogonal to the light-propagating direction beyond the prism 13.

The light rays 11', after refraction by the prism 13, are collected, on axis, by a lens 14, forming a second optical imaging system. Thus the image in plane 18 is relayed to form a second real image in a plane 15, as shown by the intersection of rays 11''.

Lens 14 is arranged so that the axial pencil of rays from lens 10 is collected on the axis of lens 14. The optical axis of lens 14 is parallel to the light-propagating direction and orthogonal to the real image plane 18. Hence, the plane 15 is orthogonal to the axis of lens 14 and, in the practical embodiment, the target surface of a camera tube is placed in the plane 15.

Thus, it will be seen that the optical system of FIG. 1 enables an image of a tilted object surface 12 to be provided, in good focus, on a target surface 15 which is orthogonal to the final optical axis of the system.

For clarity in FIG. 1, the real image plane 18 is shown external to prism 13, although intersecting the emergent face. In practice, it is desirable for the real image plane to be near the center of the refracting wedge, in order to reduce the image aberration produced by the refracting wedge.

The single prism of FIG. 1 may be replaced by a plurality of prism elements, either to increase the angle of deflection or to correct for image aberrations, in known manner.

Also, in known manner, the plane-faced prism 13 of FIG. 1 may be replaced by an off-axis portion of a lens.

The optical system of FIG. 1 is satisfactory for a visual display optical probe in circumstances where the object surface tilt angle is fixed and thus requires only fixed compensation. Such conditions would apply to marine craft simulation or for solely on-ground conditions in aircraft simulation.

The deflection angle of prism 13 is fixed and, consequently, variable tilt compensation is not possible with the optical system of FIG. 1.

An optical system, suitable for an optical probe for conditions of variable simulated height and pitch, calls for variable tilt compensation. This can be provided by means of variable elements in the optical system, such as by counter-rotating prism arrangements by lens elements displaceable in their own planes.

When the deflection angle of the refracting wedge is made continuously variable, to provide variable tilt compensation, it is usually necessary in practice to include reflecting optical elements in the system, so that the second optical imaging system can receive incident light axially.

Any optical element, whether reflecting or refracting, which deflects radiation from its initial direction, also alters the tilt of any image surface associated with the radiation. If a reflecting surface deflects a beam of radiation through an angle A then an image surface associated with the beam is tilted through an angle A, (neglecting any image aberrations introduced by the surface). If a refracting wedge, which may be part of a lens element, deflects a beam through an angle B, then an image surface associated with the beam is tilted through an angle $-B/n$, (again neglecting aberrations), where $n$ is the refractive index of the wedge.

In designing an optical device which will give a range of image tilt without beam deflections of the same order, it is necessary to use a combination of elements whose individual beam deflections may combine to give no net beam deflection, but whose individual image tilt contributions combine to give a usuable tilt angle. It is impossible to design such a device using only reflecting elements, since the relationship between beam deflection and image tilt is the same for each element. In principle, it is possible to design such a device using only refracting elements, since the relationship between beam deflection and image tilt at each element is dependent on the refractive index of the element, and a range of different index glasses may be used. However, all refractive indices are positive, and the ratio of a maximum usable refractive index to a minimum usable refractive index is not large. Therefore, a very large number of refracting elements would be required in practice to form a system capable of producing a large range of image tilts without substantial beam deflections.

A variety of practical optical devices giving image tilt without substantial beam deflection can, however, be constructed using a combination of reflecting and refracting elements. The refracting element or elements are then adjusted to give beam deflection and the associated reflecting element or elements are simultaneously adjusted to give equal and opposite beam deflection, so that there is no net beam deflection. While reflecting elements give image tilt in the same sense as beam deflection, however, refracting elements give image tilt in the sense opposite to the beam deflection. Thus, the combined adjustment which gives no net beam deflection gives a substantial image tilt, both refracting and reflecting parts contributing image tilt in the same sense.

Nevertheless, the refracting part of such devices, referred to herein as the refracting wedge, is the more significant part optically, because it produces image tilt with respect to the radiation propagation direction. Reflecting optical elements produce no such image tilt. These elements provide for folding of the radiation paths, particularly for enabling image forming optical systems to be used substantially on axis.

In one optical system providing variable tilt-compensation, reflecting elements are provided remote from the refracting wedge and from the real image formed. These reflecting elements may then be regarded as adjustable parts of the optical imaging systems. Such reflecting surfaces are preferably flat surfaces, to avoid image aberration.

One such optical system providing variable tilt compensation is shown in FIG. 2. In FIG. 2, the refracting wedge comprises two similar groups of glass prisms 70 and 71 set on each side of a real image plane 72. Each prism group is designed to minimize the image aberration which it introduces. The first optical system is an image forming lens 73, a reflecting prism 74 and a field lens 75. The second optical system, similar to the first, consists of a relay lens 76, a reflecting prism 77, and a field lens 78. The lenses 73 and 76 lie on a common optical and mechanical axis indicated by the line 79. The reflecting prism 74 provides two internal reflections at flat surfaces, folding the optical axis of the first optical system on the side of lens 73 towards the refracting wedge. After the first reflection, at surface 700, the optical axis lies on line $79^{I}$. After the second reflection, at surface 701, the optical axis lies along the line $79^{II}$. The line $79^{II}$ intersects with the line 79 within the refracting wedge. The first prism group 70 of the device, is fixed with respect to the first optical system and provides a deflection of the beam equal to the angle between line 79 and line $79^{II}$. Thus, the prism group 70 effectively deflects the optical axis of the first optical system so that, between the two prism groups, it again lies on the line 79. The effect of the two reflections within the prism is to compensate exactly for the beam deflection introduced by the first prism group.

The second reflecting prism 77, in the second optical system, is fixed with respect to the second prism group 71 and its function is to compensate for the beam deflection produced by the second prism group. The optical axis of the second optical system is folded by two internal reflections at flat faces of the prism 77. Before the first reflection, at face 702, the axis lies on the line $79^{III}$. After the first reflection, it lies on the line $79^{IV}$. After the second reflection, at face 703, the optical axis again lies on the line 79. The second prism group provides a beam deflection such that the optical axis of the second optical system is effectively deflected from the line 79 between the two prism groups onto the line $79^{III}$. The light beam passing through the apparatus follows the optical axes of the two optical systems.

The two field lenses 75 and 78 lie close to the refracting wedge on optical axes $79^{II}$ and $79^{III}$ respectively. The combined function of the two field lenses is to focus an image of the pupil of lens 73 onto the pupil of lens 76, to minimize the necessary aperture of these lenses.

The first optical system, components 73, 74 and 75, and the first prism group 70 of the optical device, are mounted together. The second optical system, components 76, 77 and 78, and the second prism group 71 of the optical device, are also mounted together. The second commonly mounted group may be a mirror image of the first, except that the lenses 73 and 76 may conveniently have different powers.

The lens 73 produces a real image, by way of prism 74 and field lens 75, in the region of the image plane 72. Light from this image is passed through field lens 78 and prism 77 to the relay lens 76. The image, as it appears from the relay lens, has tilt introduced by the refracting wedge, with respect to the beam propagation direction. The two parts of the refracting wedge produce equal amounts of tilt, since the construction of the two parts is similar, and these amounts are constant, since neither group of prisms is internally adjustable.

Each prism group, with its commonly mounted optical system, is independently rotatable about the optical and mechanical axis, line 79. This rotational adjustment on each prism group provides the required adjustment in net image surface tilt, with respect to the beam propagation direction, introduced by the prisms. The linked rotational adjustment on the associated optical systems provides continuous compensation for the change in beam deflection introduced by rotating the prisms.

To introduce a maximum image surface tilt, the two prism groups are set in the position indicated in FIG. 8. The two prism groups introduce beam deflection, and hence image surface tilt, in the same sense. To reduce the amount of image surface tilt which is introduced, the two prism groups are rotated in opposite directions on the axis 79. This adjustment progressively reduces the vector sum of the image surface tilts introduced by the two prism groups until the two prism groups are in the relative rotational position indicated in FIG. 9. In FIGS. 8 and 9, the same components are indicated by the same reference numerals. In the position shown in FIG. 9, the two prism groups introduce beam deflection and image surface tilt in opposite senses. The two prism groups being of equal power, the net image surface tilt is zero. Any relative rotational position for the two prism groups may be selected, between the positions indicated in FIGS. 8 and 9, to give a continuous range of possible image surface tilt correction angles. The sense of the tilt correction angle may be selected by rotation of the two prism groups together.

The arrangement shown in FIGS. 8 and 9 is a particularly convenient arrangement, since the adjustments required within the optical systems are directly linked with adjustment to the refracting wedge. However, the invention includes arrangements in which adjustments to the refracting wedge are not directly linked with the compensating adjustments required in the optical systems.

An optical system may be used, for providing variable tilt compensation while producing no overall beam deflection, comprising a mirror combined with a refracting wedge, for example a lens, to form a rigid, unitary, composite optical element.

Such an optical system is shown in FIG. 4. In FIG. 4 the composite optical element is a concave spherical mirror 30 mounted coaxially and in peripheral contact with a bi-concave glass lens 31. The first optical imaging system is a lens 32, which receives light from an object surface 33 and throws an image of the surface onto the optical device. Light associated with the image enters the optical device through the biconcave lens, reaches a focus in the region of the mirror, is reflected at the mirror and returns through the biconcave lens. The light is deflected by the optical device so that it falls onto the second optical system, a lens 34. Lenses 32 and 34 are equidistant from the optical device. The optical axes of the two optical systems, indicated respectively by lines 35 and 36, meet at a point 37 on the axis of the optical device, indicated by line 38. Point 37 lies within the optical device, at the apparent depth of the mirror surface as viewed through the biconcave lens.

The optical power of the concave mirror is $K_m$, a positive value in diopters, and the optical power of the biconcave lens is $K_1$, a negative value in diopters. The total effective power of the optical device is therefore approximately $K_m + 2 K_1$. It should be noted that the lens is traversed twice by the light rays. This power sum is calculated so that the device forms a real image of the pupil of lens 32 onto the pupil of lens 33; that is, if the distance between the optical device and each of the lenses measured in meters, is $d$, then it is arranged that $K_m + 2 K_1 = 2/d$. A pupil imaging property of the optical device is thus used to minimise the necessary aperture of the second optical system.

FIG. 4 is provided primarily to show the function of a spherical mirror and spherical lens combination.

In FIG. 4, the object surface is shown flat and normal to the optical axis of lens 32. FIG. 4 illustrates an embodiment of the invention only where the inclination of the object surface to the optical axis of the first lens system is variable, and then illustrates only the limiting condition, where the object surface is normal to the axis. The primary image formed by lens 32 is untilted with respect to the normal to the axis of lens 32 and does not require tilt correction. The image is therefore focused onto the centre of the optical device, so that no image tilt correction is introduced by the device. The centre of the image is formed by lens 32, so that in the absence of the optical device it would be focused on point 37 and the centre of the real image actually falls on the mirror surface. The first image surface on which, in the absence of the optical device, lens 32 would form a primary image, is indicated by the dotted line 39. It is assumed that lens 32 is well-corrected for field curvature, so that the first image surface is flat.

The second image surface, on which the reflected image appears from lens 34 to be focused, is indicated in FIG. 4 by the dotted line 300. The centre of the reflected image appears on point 37, the apparent position of the centre of the mirror. The second image surface is untilted with respect to the normal to the optical axis of lens 34, but a large amount of image surface curvature is introduced by the optical device. The curvature, as indicated, is concave towards lens 34 and it has the numerical value, or reciprocal of radius of curvature, $K_m - 2 K_1/n$, where $n$ is the refractive index of the biconcave lens.

FIG. 5 shows an arrangement as shown in FIG. 4 but with a tilted object surface and with the optical device adjusted with respect to the two optical systems to correct for tilt of the primary image. In FIGS. 4 and 5 the same reference numerals are used for the same components. In FIG. 5, the first image surface, indicated by the dotted line 39', has a tilt angle C with respect to the normal to the optical axis of lens 32.

To correct for the tilt of the primary image, the optical device is shifted a distance $h$ in a direction perpendicular to its optical axis, in the sense with respect to the primary image tilt as indicated in FIG. 5. The centre of the image falling on the optical device is now a distance $h$ from the axis of the device so that, due to the image surface curvature introduced by the device, the reflected image is given a tilt correction angle $h (K_m - 2 K_1/n)$.

The optical device has an optical power $K_m + 2 K_1$, so that a simple lateral displacement $h$ would produce a deflection of the beam associated with the image equal to $h (K_m + 2 K_1)$. Such a deflection cannot be permitted, since it would necessitate an increase in the collecting aperture of lens 34. Therefore, as the optical device is shifted laterally a distance $h$, it is also tilted through an angle $- \frac{1}{2} h (K_m + 2 K_1)$, so that there is no net change of deflection of the beam.

An image tilt angle $- h (K_m + 2 K_1)$ is introduced by the change of tilt of the optical device. The total image tilt introduced by adjustments to the optical device is therefore:

$$h (K_m - \frac{2 K_1}{n}) - h (K_m + 2K_1) = - 2 h K_1 (1 + \frac{1}{n})$$

The adjustments are made so that:

$$C = 2 h K_1 (1 + \frac{1}{n})$$

Then, the second image plane, indicated in FIG. 5 by the dotted line 300', is normal to the optical axis of lens 34, as required.

The optical device shown in FIGS. 4 and 5 always introduces curvature of the image surface in the sense indicated. In general it is necessary to compensate for this aberration in the design of other optical components so that the final image surface is flat. However, the curvature is of a kind which it is easy to correct in lens systems and the curvature may in fact ease the overall optical correction.

In general, a focus control mechanism is required in the apparatus, to allow for alterations in the distance-away of the axial area of the object surface and also to compensate for alterations in the effective position of the reflecting surface in the optical device, with respect to the axis intersection point 37, as the optical device is shifted laterally. This mechanism may be a facility for shifting one of the lenses 32 or 34, in FIGS. 4 and 5, along its own axis. Alternatively, the optical device may be shifted along its own axis. Such a shift does not substantially affect the image tilt introduced by the device.

A large variety of equivalent arrangements are possible. It is convenient to use refracting wedge elements and reflecting elements which have dioptric power, such as the elements shown in FIGS. 4 and 5, since with such elements a change of image tilt may be introduced simply by shifting the elements substantially in their own plane. It is further convenient, again as illustrated in FIGS. 4 and 5 to arrange that the refracting and reflecting elements are mounted together, so that only a single unit need be adjusted with respect to the optical systems.

Figure 6:
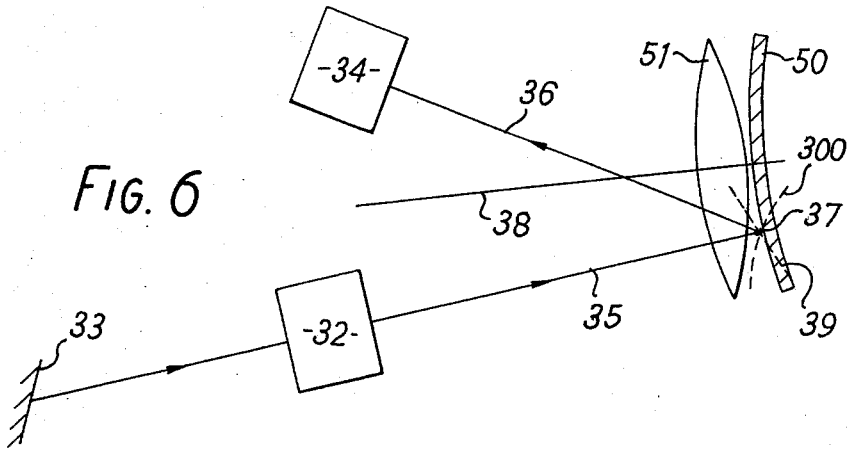
FIG. 6 shows an optical system in which the refracting wedge is a converging lends.

An alternative arrangement in which powered elements are mounted together is shown in FIG. 6. In FIG. 6, an optical device comprises a convex spherical mirror 50 mounted coaxially with a biconvex glass lens 51, serving as a refracting wedge. Other components in FIG. 6 are given the same reference numerals as like components in FIG. 4. The negative power of the mirror largely compensates for the positive power of the lens so that, as before, the beam deflection produced on shifting the unit in its own plane is compensated by a relatively small tilt of the unit. The unit however produces a large image surface curvature which in this case is convex towards lens 34, both elements contributing curvature in the same sense. This image curvature may be regarded as a large capacity for producing image tilt as the unit is decentred. The equations used above in discussion of the system shown in FIGS. 4 and 5, apply also to the system shown in FIG. 6, though the powers of the elements are of reversed signs.

Figure 7:
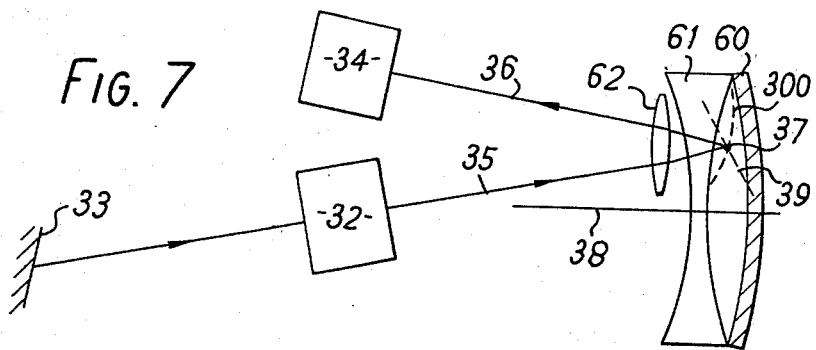
FIG. 7 shows a modified form of the system of FIG. 4, including a stationary field lens.

It is convenient in apparatus of the kind shown in FIGS. 4 and 6, to arrange that the net optical power of the optical device is such that the pupil of the first optical system may be imaged onto the pupil of the second optical system, thus minimising the necessary pupil diameters of the optical systems. In an alternative arrangement shown in FIG. 7, a field lens 62 is used to perform the pupil imaging function, and the optical device is designed to have zero net optical power. The optical device is a concave spherical mirror 60 mounted together with a biconcave glass lens 61 of equal and opposite optical power. Other components shown in FIG. 7 are given the reference numerals of like components in FIGS. 4, 5 and 6. With regard to beam deflection, the optical device now behaves like a flat mirror, but it produces a large image surface curvature, as before, so that, as it is shifted in its own plane, it introduces image tilt. The field lens is set close to the optical device. It is not shifted with respect to the optical systems, but is regarded as part of the optical systems. If the two optical systems are both at a distance $d$ from the field lens, then the field lens focal length is set equal to $d$. The beam passes twice through the field lens. In an arrangement such as that shown in FIG. 7, it is not necessary to tilt the optical device as it is moved laterally, since the device has no net optical power.

In arrangements such as those described with reference to FIGS. 4–7, using a refracting wedge comprising a lens mounted integrally with a mirror, the dioptric power of elements in the optical device may be wholly or partly cylindrical power rather than spherical power. In this case, the image surface curvature introduced by the optical device is cylindrical or toroidal rather than spherical. Image surface tilt is again introduced by shifting the device substantially in its own plane.

An alternative arrangement may employ refracting elements in the optical device which have prismatic rather than dioptric power, that is the device may use refracting wedges rather than lenses. A pair of wedges through which the light passes sequentially, each rotatable broadly in its own plane may, by separate rotational adjustment, be used to give a range of beam deflection and of image surface tilt. One or more flat mirrors or reflecting prisms may be used with a pair of wedges. The tilt of the mirror or mirrors compensates for beam deflection introduced by the wedges.

In any of the arrangements using a refracting wedge in the form of a lens described above, some image aberration, apart from field curvature, is in general introduced by the optical device. Such aberration is more particularly associated with refracting surfaces which, though close to the real image surface, are not at the real image surface. Image aberration may be corrected by the use of more complex elements in the lens. Thus, the singlet lenses shown in FIGS. 3 and 5 would be replaced by doublets, triplets or more complex groups of elements having the same net effective power as the singlets replaced.

In the foregoing description of practical embodiments of the invention, the function of the optical arrangement has been stated to be the compensation for a tilted object surface, using a target surface orthogonal to the final optical axis.

Reversely, the same devices would serve for corresponding compensation with a tilted target surface and an object surface orthogonal to the optical axis of the collecting optics. The ray paths shown in the diagrams are reversed and the first and second imaging systems reverse their functions.

Such reversed arrangements may be used for laser scanners. In such a case, the object surface is the plane in which the moving laser beam is brought to a focus. The surface, formerly of the camera target, becomes the surface of a terrain model.

Also, in the foregoing description of practical embodiments, the optical imaging systems have been described as simple lenses. When purely refracting elements, they will normally be compound lenses. However, they may alternatively include, or comprise, mirror elements.

Throughout the descriptions, references to "light" must be understood to include not solely visible light, but light in the ultra violet and infrared range also.

I claim:

1. An optical arrangement comprising first and second optical imaging systems with an optical device including an optical refracting element therebetween, said first and second optical imaging systems respectively defining first and second optical axes, said first optical imaging system being positioned in the said optical arrangement for viewing an object surface inclined to the first optical axis, said inclined object surface defining a first image surface of said first optical imaging system correspondingly inclined to the first optical axis, said optical device defining a deflected first optical axis part and providing a deflected image at a surface different from said first image surface, said second imaging system being positioned in the said optical arrangement for viewing said deflected image and for providing a second image upon a target surface, said deflected first optical axis part and said second optical axis intersecting at a point located substantially at said deflected image surface and the angle formed between the second optical axis and the deflected image surface defining a corresponding angle between the second optical axis and the target surface.

2. An optical arrangement as claimed in claim 1, in which the deflected image surface and the target surface are both orthogonal to the second optical axis.

3. An optical arrangement as claimed in claim 2, in which the said optical device comprises a prism element and in which the first image surface and the deflected image surface intersect on a line and define an angle $-B/n$ thereat, where B defines the angle of beam deflection by the prism element and $n$ defines the refractive index of the prism element.

4. An optical arrangement as claimed in claim 2, in which the said object surface is variably inclined to the first optical axis and in which the said optical device has at least one movable element.

5. An optical arrangement as claimed in claim 4, in which the said optical device includes a spherical mirror and spherical lens combination variably laterally displaced with respect to the intersection point of said first and second optical axes.

6. An optical arrangement as claimed in claim 1, in which the said optical device comprises at least one prism element.

7. An optical arrangement as claimed in claim 6, in which the first optical imaging system includes a first reflecting optical element producing a deflected part of said first optical axis and in which the second optical imaging system includes a second reflecting optical element producing a deflected part of said second optical axis, said optical device comprising a first prism group for producing a counter-deflected part of said first optical axis, said optical device further comprising a second prism group for producing a counter-deflected part of the second optical axis aligned with the counter-deflected part of the first optical axis at the said first image surface.

8. An optical arrangement as claimed in claim 7 in which said first and second reflecting optical elements are reflecting prisms.

9. An optical arrangement as claimed in claim 7 in which said second prism group and said second optical imaging system are together rotatable, relatively to said first prism group and said first optical imaging system, about an axis defined by said aligned first and second optical axis counter-deflected parts.

10. An optical arrangement as claimed in claim 1, in which the said optical device includes a mirror and wherein said optical refracting element is a lens.

11. An optical arrangement as claimed in claim 10 in which the said optical device comprises a concave spherical mirror and bi-concave lens, in combination as a unitary structure.

12. An optical arrangement as claimed in claim 10, in which the said optical device comprises a convex spherical mirror and bi-convex lens, in combination as a unitary structure.

13. An optical arrangement as claimed in claim 10, in which the said optical device comprises a concave spherical mirror, a bi-concave lens and a field lens.

* * * * *